Dec. 30, 1930.  G. S. LEWIS  1,787,115
WELDING MACHINE
Filed May 18, 1928   3 Sheets-Sheet 1

Inventor
George S. Lewis

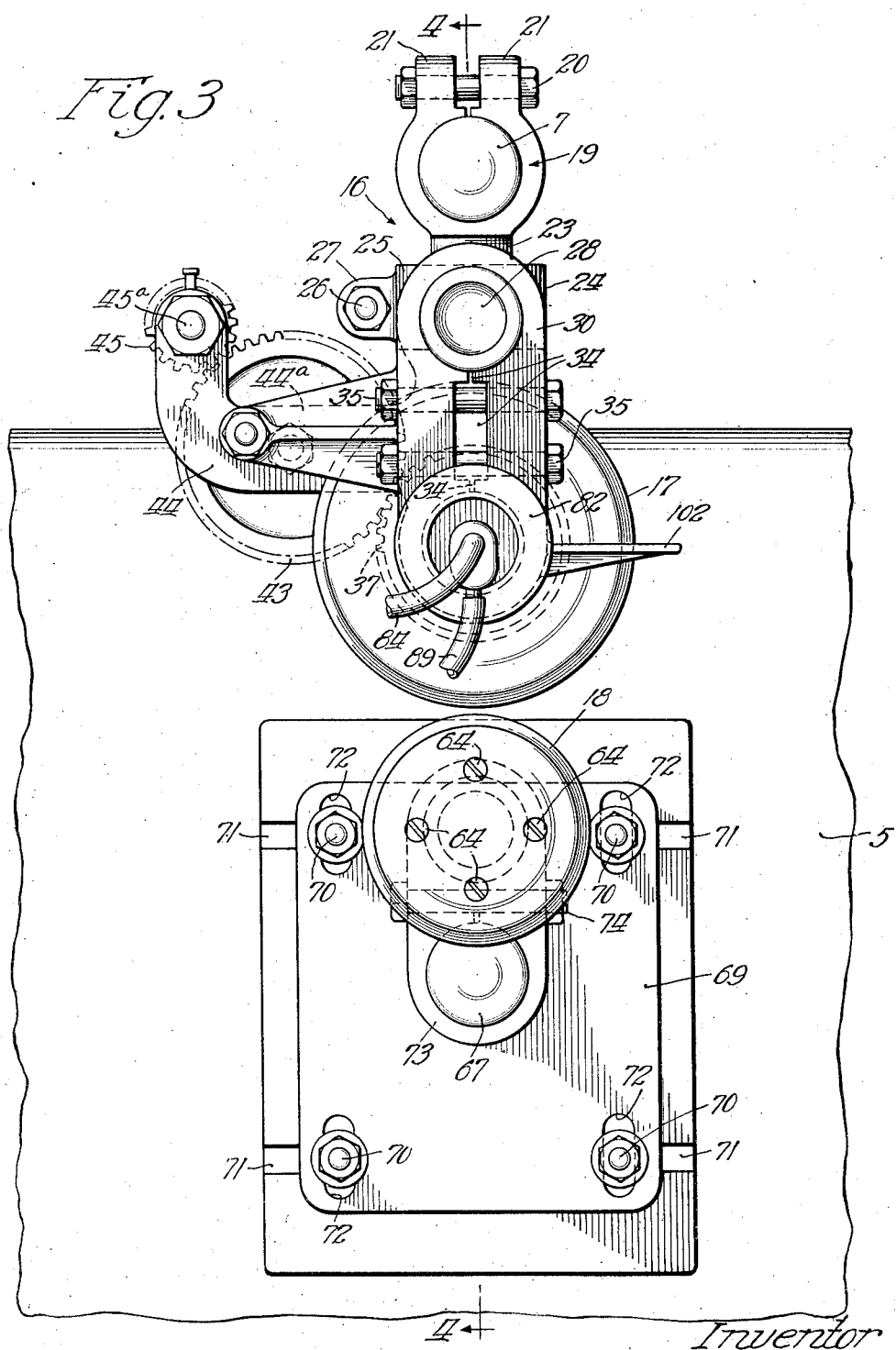

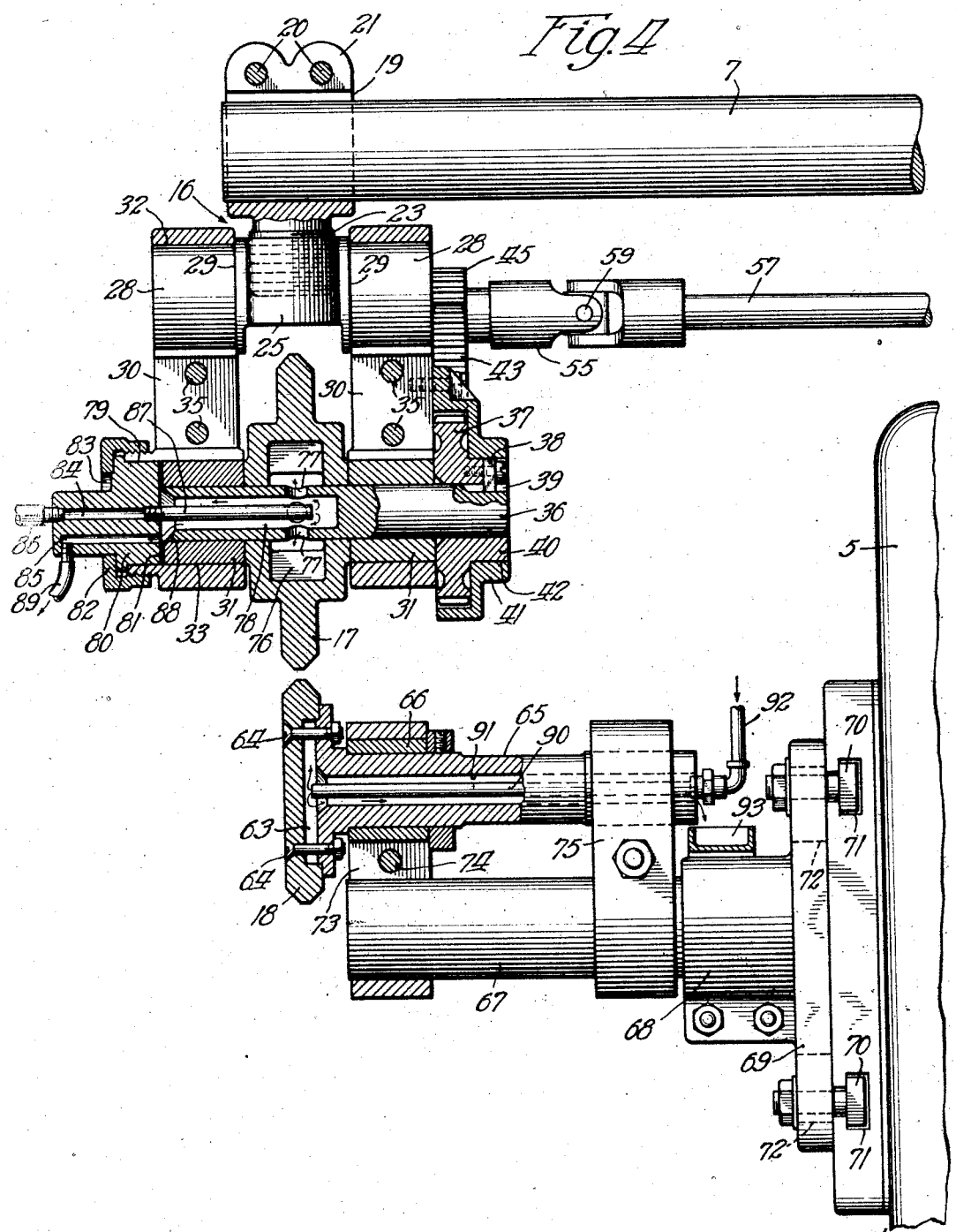

Patented Dec. 30, 1930

1,787,115

UNITED STATES PATENT OFFICE

GEORGE S. LEWIS, OF OAK PARK, ILLINOIS

WELDING MACHINE

Application filed May 18, 1928. Serial No. 278,788.

My invention relates more particularly to electrical welding machines of the so-called seam or line welding type, more especially of the kind comprising opposed rotatable electrodes spaced apart to receive and engage between them the objects to be welded.

One of my objects is to provide a simple and economical construction of welding machine of the type above stated.

Another object is to provide attachments for application to spot welding machines of common form for converting them into seam or line welders.

Another object is to provide improvements in welding machines whereby they will be adapted for universal seam or line welding.

Another object is to provide improvements to the end that the machine may be used not only for welding seams which extend lengthwise of the article, as for example the longitudinal seams of cylindrical members, but also peripheral seams, as for example seams which extend about the peripheries of cylindrical members, and to accomplish this result by a simple and economical construction of machine.

Another object is to provide improvements to the end that the upper electrode may, when the welding surface thereof becomes upset in continued use, be dressed to the desired contour without removing the electrode from its position in the machine.

Another object is to provide an improved construction of support for the upper electrode permitting quick disassembling of the electrode from the other parts of the machine, as for example when it is required that this electrode be dressed in a lathe or another electrode substituted therefor, and the quick assembling of the electrode into the proper position in the machine.

Another object is to provide improved means for cooling the electrodes; and other objects as will be manifest from the following description.

Referring to the accompanying drawings:—

Figure 3 is an enlarged face view of the machine of Fig. 1, with certain parts of the body portion of the machine broken away; and Figure 4, a section taken at the line 4—4 on Fig. 3 and viewed in the direction of the arrows.

Figure 1:
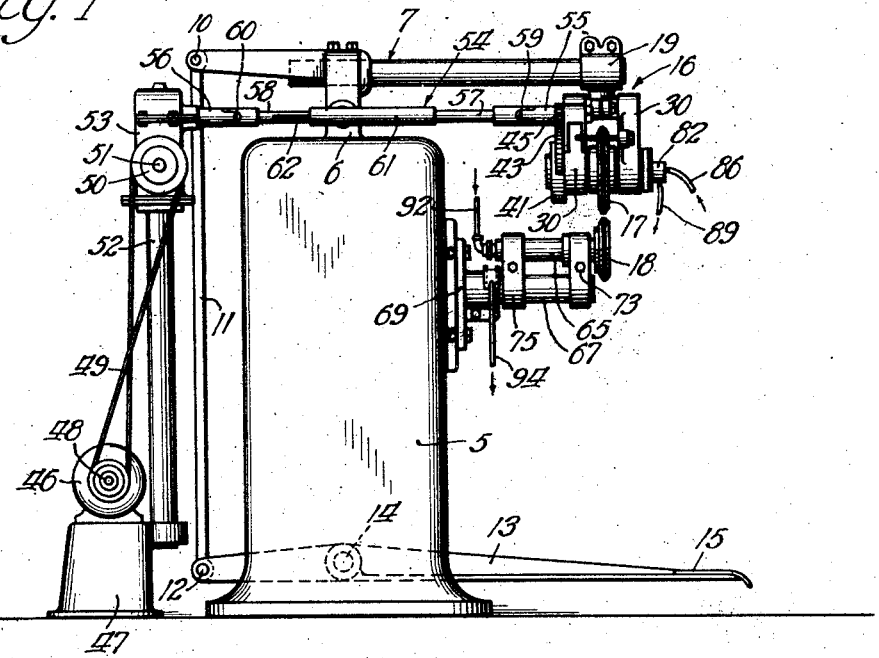
Figure 1 is a view in elevation of a machine equipped with my improvements, the machine being conditioned for the welding of peripheral seams, as for example at the ends of cylindrical members or the peripheral seams of metal wheel rims.

Referring first to the machine as shown in Figs. 1, 3 and 4, the machine comprises a base-frame or casing structure 5 at which it is adapted to rest upon the floor and from the top of which rise spaced apart lugs 6 one only of which is shown. Extending into the space between the lugs 6 is a lever represented at 7 this lever being pivoted between its ends to the lugs 6 as represented at 8 and comprising a forwardly-extending bar section 9 common in welding machines and extending outwardly a considerable distance beyond the casing 5. The lever 7 at its opposite end is pivotally connected at 10 with the upper end of a link 11 the lower end of which is pivoted at 12 to the rear end of a lever 13 extending through the lower portion of the casing 5 and pivotally supported therein between its ends as represented at 14. The end of the lever 13 opposite that connected with the link 11 is provided with a foot-rest 15 serving as a means whereby the operator may rock the lever 7 by foot-pressure, it being noted that when the lever 13 is depressed by pressure applied downwardly to the portion 15 thereof, the outer end of the rod section 7 is also depressed.

The machine also comprises a welding head represented generally at 16 and supported on the outer end of the rod 7, this head being provided for rotatably supporting the positively driven upper electrode 17 for cooperation with the lower rotatably mounted electrode 18 supported on the casing 5 in a manner hereinafter described in vertical alignment with the electrode 17.

In the use of the machine the article to be welded is introduced into the space between the two electrodes 17 and 18; and the upper article-feeding electrode 17 is forced down against the article by actuating the lever 13 (the electrode 17 being positively driven, as hereinafter described,) to effect, by current traversing these electrodes and the work between them, continuous, seam or line, welding of the article as it feeds through between these electrodes under the driving action of the upper one thereof.

The head 16 comprises at its upper extremity, a split clamp section 19 encircling the rod 7 and rigidly clamped thereto as by a bolt 20 passing through ears 21 on the section 19. The section 19 is provided with a depending stud 23 with which a member 24 has threaded swivel connection about a vertical axis. The connection of the member 24 with the stud 23 is through a split clamp portion 25 on the member 24, this clamp being gripped about the stud 23 by a bolt 26 passing through spaced apart ears 27 at the split portion of the clamp 25, the member 24 being provided with oppositely extending, aligned cylindrical stud portions 28 adjacent to the inner ends of which, the member 24 is annularly shouldered as represented at 29.

The head 16 also comprises a pair of hanger elements 30 rigidly clamped at their upper ends to the stud portions 28 and rigidly clamped at their lower portions about bearing members 31. The hangers 30 are preferably of the form shown, each comprising a solid member circularly recessed at its upper end as represented at 32 to surround the stud 28 on which it is carried and similarly recessed at its lower end, as represented at 33, to surround the bearing member 31 carried thereby, the member 30 being slotted from one recess to the other as indicated at 34 and provided with transversely disposed bolts 35 which pass through these members between their recessed portions and by means of which, when these bolts are drawn up, the hangers are caused to rigidly clamp the studs 28 and bearings 31 and form with the member 19 a rigid head construction.

As usual in welders of this type the electrode 17 is made of copper, is relatively massive, and is of the form shown. This electrode is located between the hangers 30 and is rigidly connected with its shaft portion 36 journalled in the members 31. The electrode-equipped shaft 36 is positively driven by means of a gear 37 connected with the shaft 36 by a key 38 on the gear 37 projecting into a keyway 39 extending longitudinally of the shaft 36. The gear 37, provided with a hub portion 40, is confined between one of the hangers 30 and a housing 41 secured to a side of this hanger, the hub-portion 40 extending into the reduced portion 42 of the housing 41.

The gear 37 is shown as driven through the medium of a gear 43 journalled on a stud 44ᵃ on a bracket 44 secured to one of the hangers 30, the housing 41 being apertured to permit of intermesh of the gears 43 and 37. The gear 43 meshes with a drive pinion 45 journalled at a stud 45ᵃ thereon in the bracket 44 and driven from a motor 46 shown as mounted on a portable base 47.

The connection between the motor and pinion 45 for driving the latter comprises, in the particular arrangement shown, a pulley 48 on the shaft of the motor 46 belted, as indicated at 49, to a pulley 50 on a shaft 51 mounted on the upper end of an upright 52 rigidly secured to the base 47. The shaft 51 is connected, by a train of speed-reduction gears (not shown) and located in the casing 53, with one end of a flexible coupling shaft 54, the other end of which is connected with the gear 45.

The coupling shaft 54 comprises stub sections 55 and 56 rigidly connected with the gear 45 and the reduction gearing referred to, respectively, and rod sections 57 and 58 connected with the stub sections 55 and 56, respectively, through the medium of universal joints 59 and 60, the rod section 57 being provided at its inner end with a sleeve 61 rigid therewith which telescopes with the adjacent end of the shaft section 58 and has driving connection therewith through the medium of a key 62 on the shaft section 58 and sliding in a keyway (not shown), located on the inner surface of the sleeve section 61 and extending lengthwise of the latter.

The purpose of the flexible driving connection described is to permit of the up and down movement of the head 16, responsive to the swinging of the lever 7, without injuring, or cramping, the driving connections between the motor and the gear 45, this feature of the construction also permitting of the provision of the motor and the speed reduction mechanism, as a structure independent of the machine proper without the necessity of accurate positioning of the motor relative to the gear 45.

The lower electrode 18, also made of copper, is in the form of a disk containing a recess 63 in its rear face at which portion it is rigidly flatwise connected, as for example by the bolts 64, to the end of a shaft 65 extending parallel with the shaft 36 and journalled in a bearing member 66 secured to the outer end of a stud 67 supported at its inner end in a clamp 68 mounted on a plate 69 releasably secured to a face of the base 5, by means of bolts represented at 70.

The bolts 70 are shown as carried by the plate 69 and interlockingly extend, at their heads, into parallel grooves 71 in the face of the base 5, the openings in the plate 69 through which the bolts 70 extend being shown as vertically elongated as represented at 72 for the purpose of vertical adjustment of this plate.

The means shown for connecting the bearing member 66 to the stud 67 are in the form of a clamp-member represented at 73 and of the same construction as the hangers 30, the upper end of the member 73 gripping the bearing 66 and the lower end thereof gripping the stud 67, with means for drawing the clamp into clamping engagement with these parts, shown as a single bolt 74. The rear end of the shaft 65 is also connected with the stud 67 by a clamping member represented at 75 and of the same construction as the clamping member 73.

The electrode 18 is positioned in direct vertical alignment with the electrode 17 and in the operation of welding the article, driven by the driven electrode 17, rotates in the journals supported on the stud 67.

It is desirable in structures of this general type to subject the electrodes to a cooling medium, as for example cold water, to conduct away the heat generated in the welding operation, this being provided for in my machine by constructing it in accordance with the following description.

Referring first to the cooling of the upper electrode 17, the hub portion of the disk member of this electrode is internally recessed as represented at 76, this recess communicating, through radially-disposed passages 77, with a recess 78 provided centrally in the shaft 36. The shaft 36, at the end thereof opposite that which engages with the gear 37, reaches short of the tubular extension-equipped portion 79 of the hanger 30 at the left-hand side of Fig. 4, and fitted into this tubular extension 79 is a plug 80 between the inner end of which and the adjacent end of the bearing 31, a washer 81 is interposed, this plug being held in position by a gland 82 overlapping a shouldered portion 83 of this plug and screwed upon the threaded portion of the extension 79.

The plug 80 contains passages 84 and 85, the passage 84 being connected at one end with a flexible pipe 86 for conducting cooling water into it, the inner end of this passage being connected with a pipe 87 extending lengthwise into the recess 78, but spaced from the walls of the latter and terminating at its inner, open, end adjacent the ports 77. The passage 85 communicates at its inner end with the flared outlet portion 88 of the recess 78, and at its outer end with a flexible pipe 89 for conducting away the used cooling medium.

It will be understood from the foregoing that cooling water supplied to the pipe 86 discharges from the pipe 87 into the recess 78, circulates through the chamber 76 and back to the recess 78, through the ports 77 and thence discharges through the pipe 89.

The means for cooling the electrode 18 comprise a pipe 90 extending through an opening 91 in the shaft 65 and reaching from end to end thereof, the pipe 90, which is connected with a pipe 92 leading from any suitable source of cooling medium such as cold water and rigidly supported, being spaced throughout its length from the walls of the opening 91 and opening into the recess 63 in the disk electrode 18. Thus water supplied through the pipe 92 flows through the pipe 90 into the recess 63 for cooling the disk electrode and discharges through the opening 91, exterior of the pipe 90 out through the end of the shaft 65, as for example into a trough represented at 93 and supported on the top of the clamp 68, a pipe 94 leading from this trough to any suitable point of discharge.

As in the case of machines of this general type, the electrodes 17 and 18 are arranged in series in the secondary electric circuit of a transformer (not shown) to be used for effecting the welding action whereby the current supplied to the electrodes is caused to pass from one to the other thereof through the article to be welded, the resistance of which to the passage of the electrical current produces the necessary welding heat.

Figure 2:
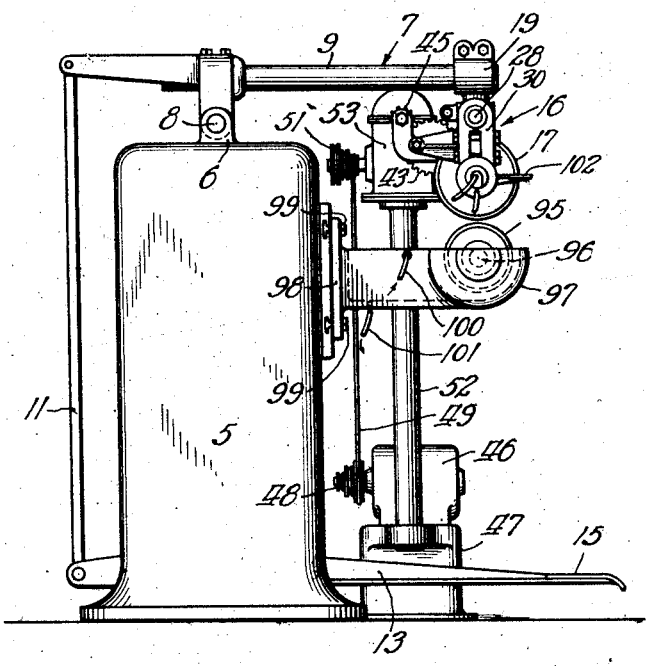
Figure 2 is a similar view of the machine conditioned for the welding of longitudinal seams, such as for example the seams which extend lengthwise of a cylindrical member.

Referring now to Fig. 2 in which my machine is shown as conditioned for welding longitudinal seams, as for example longitudinal seams in hollow cylindrical articles, all of the parts of the machine are the same as in the case of the machine of Figs. 1, 3 and 4, except the lower electrode and its supporting structure.

In the machine conditioned as now being described, the electrode 17 extends normal to the position shown in Fig. 1, this being effected by releasing the clamp 25 and rotating the parts carried thereby about the stud 23 throughout 90° and thereafter re-engaging the clamp 25 about this stud, the operator bodily shifting the base member 47, together with the parts carried thereby, to accommodate this mechanism to the changed position of the head 16.

The lower electrode in this machine is represented at 95 and is supported to extend directly below the electrode 18 and in vertical alignment therewith, and spaced therefrom, on a shaft 96 journalled at its opposite ends in the side walls of a trough 97 extending outwardly from a plate 98 provided with bolts 99, as in the case of a plate 69, adapting it to be connected with the base 5 as explained of the plate member 69 for which, it will be understood, the plate 98, with its trough, is substituted to condition the machine for longitudinal seam welding. The cooling medium in this case is circulated through the trough 97 and against the electrode 95 by introducing water into the trough through a pipe 100 and withdrawing it through a pipe 101.

From the foregoing description it will be understood that by providing the two lower electrode structures with their supporting parts, the machine may be readily converted from a longitudinal seam welder into a peripheral seam welder, or vice versa, at will and with ease and great expedition, and that the structure by which this may be effected, is relatively simple and economical of manufacture.

As is well understood in the art the continued operation of the machine causes the upper electrode 17, which is of relatively soft metal, to become upset at its peripheral portion and wear away relatively rapidly. The action referred to necessitates frequent dressing of the upper electrode which, depending upon the condition thereof, may require the removal of the electrode and the dressing of the same in a lathe though in some cases its removal is not necessary provided facilities are afforded for dressing it in position in the machine.

I provide in the machine shown means on which a suitable dressing tool may be supported for trimming the electrode without disturbing its position in the machine and while being driven by the driving means above referred to, these means being shown as in the form of tool-rests in the form of lugs 102 rigidly connected with, and extending outwardly from, the hangers 30 substantially at the same elevation as the axis of the shaft 36, these rests forming supports for the dressing tool held in the hand of the operator and applied to the periphery of the electrode for effecting the dressing operation.

One of the principal advantages of my machine consists in its capability of ready removal and replacement of the electrode 17, this being made possible by virtue of the removability of the hanger 30 at the left-hand side of Fig. 4 and the character of the connection between the shaft 36 and the gear 37, the removal of this electrode requiring only the removal of the gland 82 and the hanger just referred to whereupon the shaft 36 with the electrode thereon may be drawn out of the bearing 31 at the right-hand side of Fig. 4 and out of engagement with the gear 37 which latter, by reason of the housing therefor, as above described, remains on the hanger carrying it and in aligned position with the bearing 31. The reassembly of the electrode-equipped shaft with the supporting structure therefor, or the substitution of a new electrode, may be readily effected by a reversal of the operations just described.

While I have illustrated and described a particular construction embodying my invention, I do not wish to be understood as intending to limit it thereto as the same may be variously modified and altered without departing from the spirit of my invention.

What I claim as new, and desire to secure by Letters Patent, is:

1. In a machine of the character set forth, the combination of a support, a drive member, a rotatable electrode removably mounted on said support and having slip joint driving connection with said drive member, and means on said support for holding said drive member in a position permitting re-assembly of said electrode therewith.

2. In a machine of the character set forth, the combination of a support, a pair of hangers on said support each comprising clamp portions at its opposite ends, bearing members, one of said clamp portions of each hanger engaging said support, the other clamp portions of said hangers engaging said members respectively, means for tightening said clamp portions, a drive member, and a rotatable electrode operatively engaging said drive member and removably journalled in said bearing members.

3. In a machine of the character set forth, the combination of a support, a pair of hangers on said support, each comprising clamp portions at its opposite ends, bearing members, one of said clamp portions of each hanger engaging said support the other clamp portions of said hangers engaging said members, respectively, means for tightening said clamp portions, a drive member, a rotatable electrode operatively engaging said drive member and extending into said hangers and removably journalled in said bearing member, and means on one of said hangers holding said drive member in a position permitting re-assembly of said electrode therewith.

4. In a welding machine, an electrode formed of a shaft containing a recess opening through one end of said shaft and a disk portion surrounding said shaft and internally recessed, a journalling support for said electrode, a plug on said support and opposing the recessed end of said shaft, said plug containing separate passages, and a pipe communicating with one of said passages and extending into the recess in said shaft in spaced relation to the wall of said recess, the wall of the recess in said shaft being ported for communication of the recess in said shaft with the recess in said disk portion.

5. In a machine of the character set forth, the combination of a support, a member swiveled between its ends on said support, a pair of hangers on the ends of said member, each of said members comprising clamp portions at its opposite ends, bearing members, one of said clamp portions of each hanger engaging said first-referred-to member, the other clamp portions of said hangers engaging said bearing members, respectively, means for tightening said clamp portions, a drive member, and a rotatable electrode operatively engaging said drive member and removably journalled in said bearing members.

6. An attachment for a welding machine having an electrode, comprising a support, a head, an electrode journaled in said head to coact with the first electrode and weld work passed between the electrodes, said head being adjustable on said support for positioning said second electrode in different positions in a given plane, a portable power device separate from said support and movable into different positions for cooperating with said second electrode in the different positions of the latter, and a drive connection between said power device and said second electrode.

7. An attachment for a welding machine having an electrode, comprising a support, a head bodily movable on said support, an electrode journaled in said head to coact with the first electrode and weld work passed between the electrodes, said head being adjustable on said support for positioning said second electrode in different positions in a given plane, a portable power device separate from said support and movable into different positions for cooperating with said second electrode in the different positions of the latter, and a drive connection having a universal joint between said power device and said electrode.

8. An attachment for a welding machine having an electrode, comprising a support, a head bodily movable on said support, an electrode journaled in said head to coact with the first electrode and weld work passed between the electrodes, said head being adjustable on said support for positioning said second electrode in different positions in a given plane, a portable power device separate from said support and movable into different positions for cooperating with said second electrode in the different positions of the latter, and a drive connection having a universal joint and a telescopic portion between said power device and said electrode.

GEORGE S. LEWIS.